Aug. 31, 1937.　　　F. A. NICHOLSON　　　2,091,647
AUTOMATIC RANDOM LENGTH TRIMMER
Filed March 11, 1935　　　5 Sheets-Sheet 1

Fig. 1

INVENTOR
Frederick A. Nicholson
BY
ATTORNEY

INVENTOR
Frederick A. Nicholson
BY
ATTORNEY

Patented Aug. 31, 1937

2,091,647

UNITED STATES PATENT OFFICE 2,091,647

AUTOMATIC RANDOM LENGTH TRIMMER

Frederick A. Nicholson, Seattle, Wash., assignor to Stetson-Ross Machine Company, Seattle, Wash., a corporation of Washington Application March 11, 1935, Serial No. 10,378

4 Claims. (Cl. 143—41)

My invention relates to an automatic random length trimmer. More particularly, my invention relates to a multiple saw cut-off mechanism for trimming random length lumber to predetermined lengths varying with the particular length of a particular piece of lumber.

In the manufacture of lumber the boards or pieces of lumber in the line of production are of random length. In order to provide merchantable lumber it is necessary to cut the boards to predetermined length, as 6, 7, 8, 9, 10, or 12 feet in length. More specifically, a board between six and seven feet in length, capable of making a merchantable six foot board, may be followed by a board between ten and eleven feet in length, capable of making a merchantable ten foot board. It is an object of my invention to provide a machine which will receive and automatically trim such random length boards to the longest merchantable lengths.

It is a further object of my invention to provide lift wheels cooperating with cut-off saws to smoothly and efficiently, and without undue vibration, lift the cut-off saws which are in the path of the lumber but are not to operate on the lumber.

It is another object of the invention to provide lift wheels cooperating with cut-off saws, where the lift wheel will readily lift the cut-off saw over boards having a thickness up to the maximum cutting thickness of the cut-off saw.

It is another object of my invention to provide a plurality of cut-off saws and a plurality of lift wheels, each of which cooperates respectively with one of the cut-off saws, and to provide means for readily detaching any particular cut-off saw from its respective lift wheel. By thus providing the detachable operating means between the cut-off saws and their lift wheels, I am able to either cut all stock to a common length, such as eight feet, or I am able to cut random length stock to the maximum merchantable length obtainable from the given length of an individual board, or I am able to cut out an undesirable section intermediate the length of a board.

It is a further object of my invention to provide separate shaft mounting means for each saw and to provide a spaced apart separate mounting shaft means for the lift means which cooperates with each saw. I have shown in the drawings that the mounting shaft for a cut-off saw may be spaced below the mounting shaft for the lift wheel when a lift wheel larger than the saw is used, and I have further shown that the shaft of the saw and the shaft of the cooperating lift wheel may be spaced apart endwise, when a lift wheel and a cut-off saw of substantially the same diameter are used. In each instance, by providing separate mounting means for the cut-off saw and the lift wheel, I have provided a cut-off mechanism which is readily adapted to have a detachable connection interposed between the lift wheel mounting means and the mounting means for the cut-off saw.

A further object of the invention is to provide trimmer saw means of this nature in which the wheels which are lifted by the lumber as it passes thereunder are used to hold the lumber while the saws are trimming the same.

The above mentioned general objects of my invention, together with others inherent in the same, are attained by the mechanism illustrated in the following drawings, the same being preferred exemplary forms of embodiment of my invention, throughout which drawings like reference numerals indicate like parts.

Referring to Figs. 1 to 6, inclusive, transverse shafts 15 and 16 are supported in bearings 17 on a frame 18. A plurality of endless traveling conveyor belts 19 of link belt type extend between and are supported by sprocket wheels 20 and 21 mounted respectively on transverse shafts 15 and 16. Each conveyor belt 19 is provided with spaced apart lumber engaging lugs 22. The lugs 22 are spaced equal distances apart on all of the conveyor belts 19 and the belts are all of the same length and are positioned so that the lugs 22 are aligned in rows longitudinally of the machine, whereby an aligned set of said lugs will simultaneously engage with a piece of lumber and move said piece of lumber squarely into engagement with saws hereinafter described.

All of the conveyor belts 19 are driven in the same direction and at the same rate of speed by an electric motor 23 having a driving connection with the shaft 15 through suitable speed reduction gears, not shown, in housing 24, and through link belt 25 operable on sprocket wheels 26 and 27, the sprocket wheel 27 being on the shaft 15. As transverse shafts 15 and 16 are inter-connected by the endless traveling conveyor belts 19 and the transverse shaft 15 is driven by electric motor 23 as indicated, the plurality of endless traveling conveyor belts 19 will be synchronously moved.

The upper portions of the conveyor belts, that is, those portions extending between the upper peripheries of sprocket wheels 15 and 16, run in trough like guide members 28. Lumber supporting members 29 are preferably provided on each side of each guide member 28 at a slightly higher elevation than the adjacent conveyor belt, Fig. 3, whereby pieces 30 of lumber which are being moved by the conveyor belts 19 will rest on the supporting members 29 and not on the conveyor belts. The guide members 28 may be supported on frame bars 31, as shown in Figs. 2, 3, 4, and 5.

Figure 1:
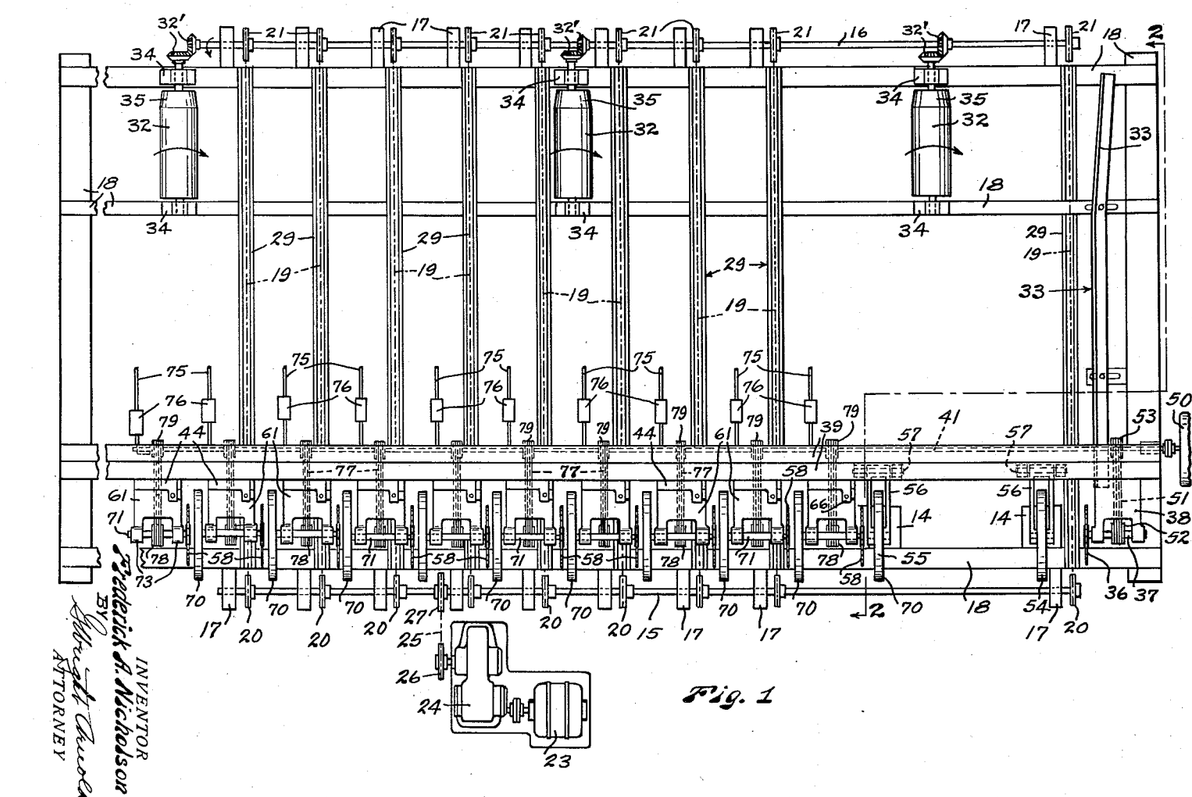
Figure 1 is a plan view, with parts broken away, showing a random length trimmer embodying my invention.
Figures 2, 3:
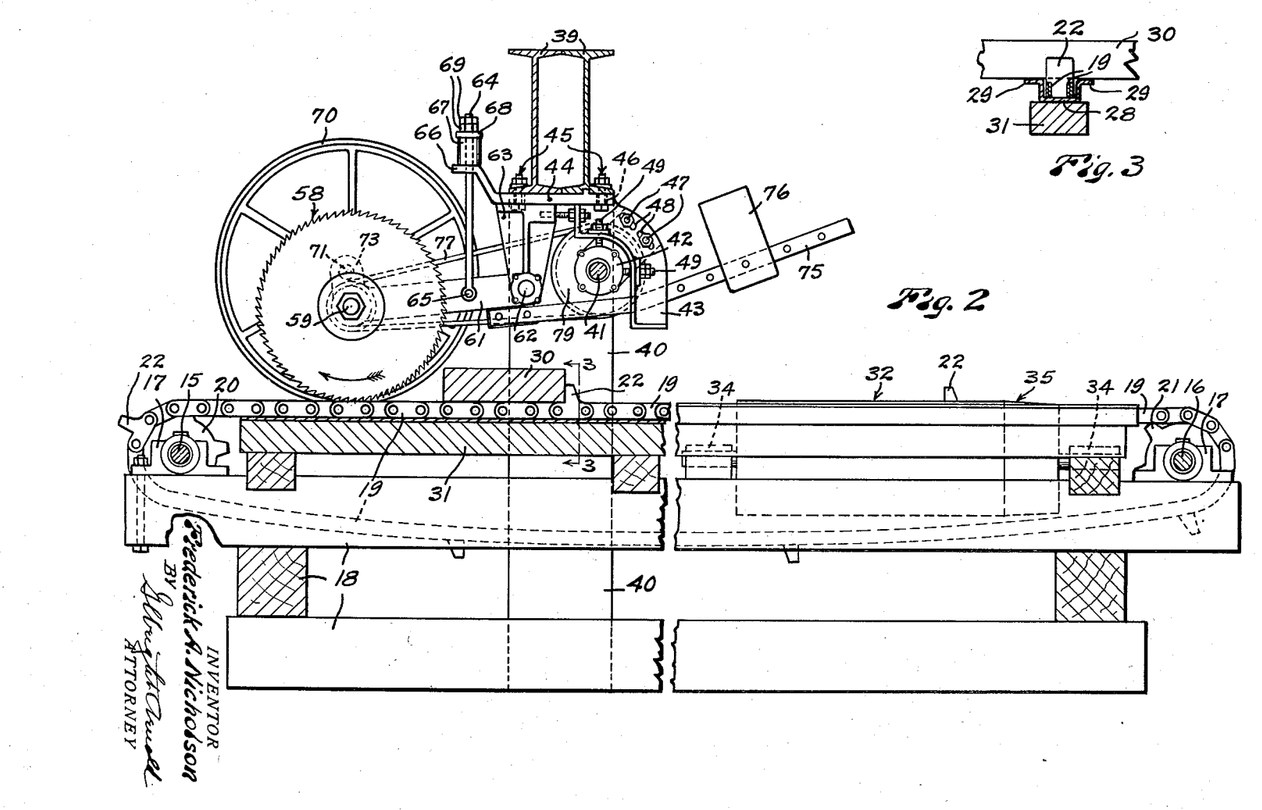
Fig. 2 is a view on a larger scale, partly in section and partly in elevation, substantially on broken line 2—2 of Figure 1, parts being broken away.
Fig. 3 is a fragmentary sectional view on broken line 3—3 of Fig. 2 illustrating a detail of the conveyor mechanism.
Figure 4:
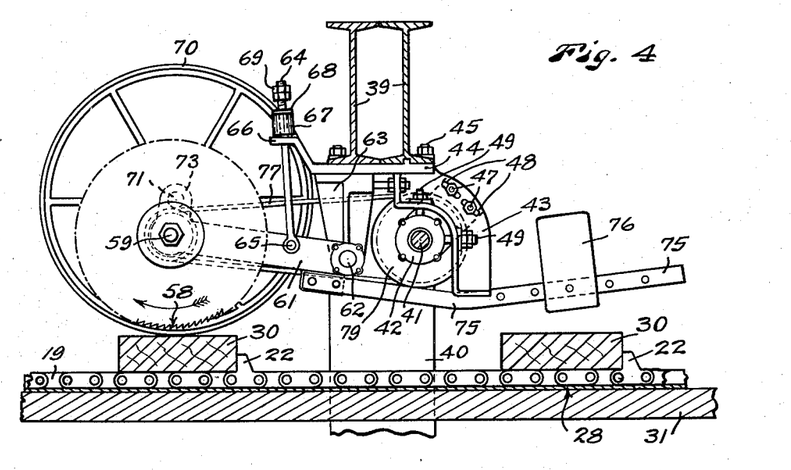
Fig. 4 is a fragmentary sectional view similar to Fig. 2, except that the saw and the lift wheel therefor are shown in elevated position, having been raised by reason of a piece of lumber passing under the lift wheel.
Figure 5:
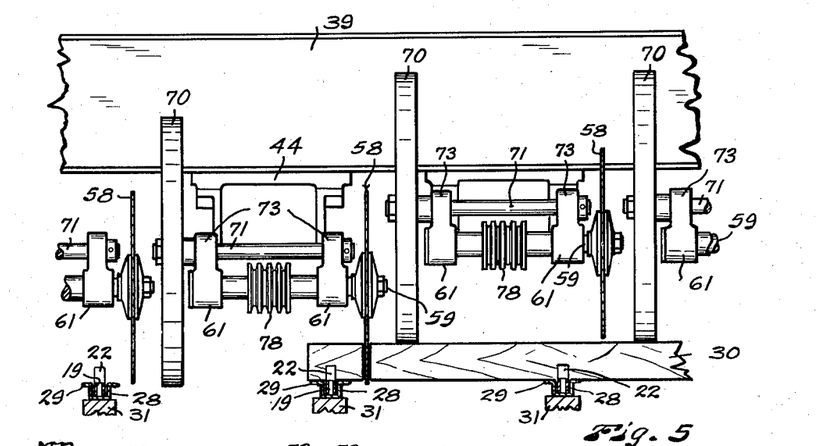
Fig. 5 is a fragmentary front elevation, showing one lift wheel and saw in an operative position trimming a piece of lumber and another lift wheel and saw in elevated position passing over said piece of lumber without trimming the same.

Pieces of lumber 30, see Figs. 2, 4, and 5, which are to be trimmed are fed either manually or by suitable automatic feeding mechanism, onto the ends of the conveyor belts 19 adjacent the shaft 16. These pieces of lumber 30 are engaged by the lugs 22 which move said pieces of lumber 30 toward the other side of the machine. These pieces of lumber may be correctly positioned on the conveyor belts manually irrespective of the manner in which they are fed to the machine. I prefer, however, to provide driven positioning rolls 32 adjacent the receiving side of the machine for the purpose of moving the pieces of lumber 30 longitudinally so that an end of each piece of lumber is abutted against a stop 33 and the piece of lumber properly positioned longitudinally for trimming. The driven positioning rolls 32 are mounted in bearings 34 and are driven from the shaft 16 through bevel gears 32'. The upper peripheral portions of these rolls 32 are positioned in a plane parallel to the plane of the top side of the lumber supporting members 29 a short distance above the plane of said lumber supporting members, whereby the lumber will rest upon the rolls 32 while it is being moved endwise of said rolls. The rolls 32 are tapered slightly at the ends adjacent the shaft 16, as indicated at 35, so that the ends of said rolls, in the direction of the approaching lumber, are below the plane of the lumber supports 29 and it is impossible for the incoming pieces of lumber to strike against the ends of the positioning rolls. The positioning rolls are driven in a direction which causes their upper peripheral portions to continuously move toward the stop member 33, as indicated by the arrows in Figure 1. As the pieces of lumber are supported on these positioning rolls while they are being moved from one end to the other of said rolls it will be obvious that each piece of lumber will be moved endwise by the rolls until the end thereof abuts against the stop 33 and the piece of lumber is correctly positioned longitudinally. As the pieces of lumber which are being moved by the conveyor belts are slidably supported either on the positioning rolls 32 or on the lumber supporting members 29, as respects transverse movement of the pieces of lumber in the longitudinal direction of the belts, it will be seen that each piece of lumber will be aligned parallel with the row of conveyor belt lugs 22 by which it is being moved. This provides for positioning each piece of lumber substantially at right angles to the plane of the saws by which it is to be trimmed and results in the pieces of lumber being squarely trimmed.

If desired, the positioning rolls 32 and stop 33 may both be dispensed with and the pieces of lumber positioned manually so that they will be trimmed to the best advantage.

Figs. 1 to 6, inclusive, disclose an embodiment of the invention in which the saw and wheel embodied in each unit are connected with each other by means which is non-detachable and which always maintains the saw and wheel in the same relative position. This construction is desirable for some uses but for other uses it may be desirable to have the saw and wheel readily disengageable, whereby they may occupy different relative positions.

Figure 6:
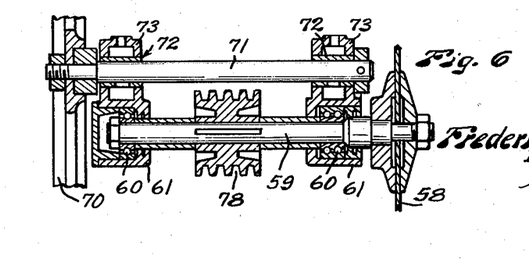
Fig. 6 is a vertical sectional view, on a larger scale than Fig. 5, through the mounting means for one of the saws and the lift wheel connected with said saw, parts being broken away.

Figs. 1 and 6 show a plurality of sawing or trimming units placed side by side, preferably at regular intervals, above the conveyor belts hereinbefore described and adapted to trim the pieces of lumber carried by said conveyor belts. These units are preferably positioned at predetermined distances from a continuously operating saw 36. This continuously operating saw 36 is positioned a short distance inwardly from the face of the stop 33 and always trims one end portion of each piece of lumber while one of the said sawing units trims the other end portion of said piece of lumber.

The continuously operating saw 36 is mounted on an arbor 37 which is journaled in suitable bearings in a bracket 38. Two I beams, constituting an overhead support 39, are positioned side by side and extend from one end to the other of the machine. The trimming mechanism may be mounted on the overhead support 39. Upright frame members 40, at the respective ends of the I beams, may support said I beams. The bracket 38 which supports the continuously operating saw 36 may be secured to the overhead support 39. A saw driving shaft 41 extends lengthwise of the overhead support 39 in spaced relation below said overhead support and is journaled in bearing members 42 adjustably supported by downwardly extending curved portions 43 of brackets 44. The brackets 44 are secured to the overhead support, preferably by bolts 45 which extend through slotted holes 46 in the brackets 44, and provide for a limited adjustment of the brackets 44 longitudinally of the overhead support 39.

Figure 7:
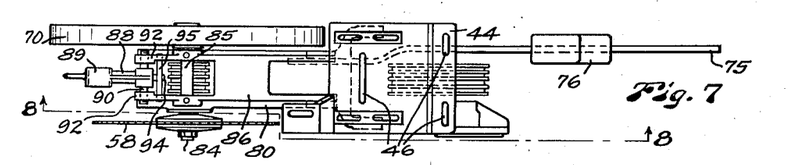
Fig. 7 is a plan view, with parts omitted, of one form of the invention in which a lift wheel is detachably connected with a saw.
Figures 8, 9, 10:
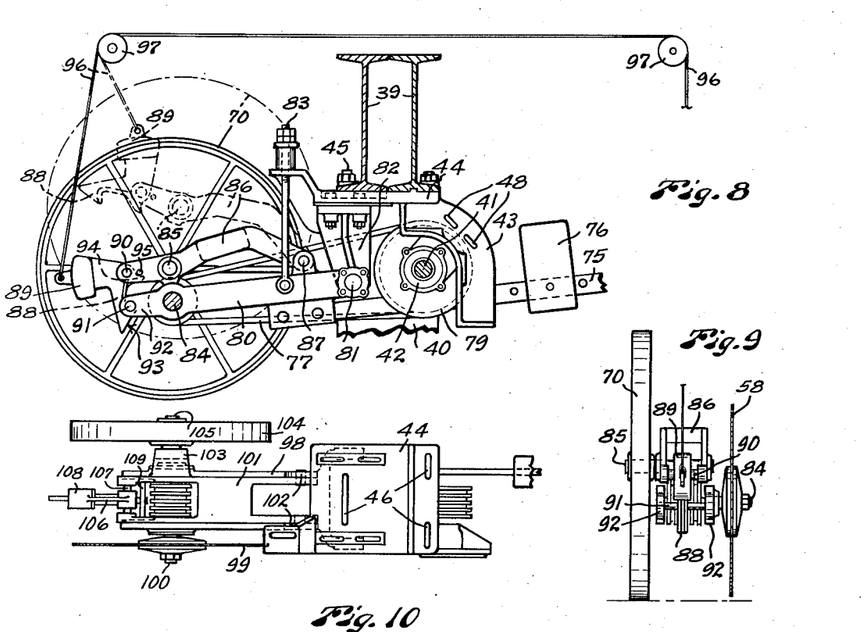
Fig. 8 is a view partly in elevation and partly in section substantially on broken line 8—8 of Fig. 7, of parts of the saw mounting means and lift wheel mounting means shown in Fig. 7, one position which certain parts may assume being indicated by dot and dash lines.
Fig. 9 is a front elevation of the mechanism shown in Figs. 7 and 8, parts being omitted.
Fig. 10 is a plan view, with parts omitted of one form of the invention in which a lift wheel and saw of substantially the same diameter are mounted on separate bearing means or arbors, which arbors are capable of being positioned in axial alignment with each other as contrasted with the device shown in Figs. 7 and 8 in which the lift wheel is of larger diameter than the saw and the arbor of the lift wheel is positioned above the arbor of the saw.

These bolts are shown in Figs. 2 and 4 and the slotted holes 46 are more clearly shown in Figs. 7, 8, and 9. The bearing members 42 are secured to the curved bracket portions 43 by bolts 47 extending through slots 48 in the bracket portions 43 and other bolts 49 are provided for accurately positioning and aligning said bearings. A driving means, as a motor 50, may be connected with the saw driving shaft 41.

The continuously operating saw 36 is driven as by a multiple ply belt 51 operating on grooved belt pulleys 52 and 53 on the saw arbor 37 and saw driving shaft 41, respectively. An idle wheel 54 is provided adjacent the continuously operating saw 36 and another idle wheel 55 is provided adjacent the saw unit which is closest to the continuously operating saw 36. These idle wheels 54 and 55 are rotatably mounted in bracket members 56. The brackets 56 are pivotally connected with the overhead support 39 by pivot means 57, leaving the idle wheels free to be lifted by and ride over the pieces of lumber which are being trimmed by the saws. The idle wheels 54 and 55 are not connected with any saws but are adapted to rest upon and hold down the pieces of lumber while they are being sawed or trimmed, thus insuring smoother and better trimming of the lumber. These idle wheels 54 and 55 may rest upon supports 14 when they are in their lowermost positions, said supports 14 preferably being slightly below the plane of the lumber supporting members 29 so that the pieces of lumber will not contact them.

The saw units, disclosed in Figs. 1 to 6, each comprise a saw 58 mounted on an arbor 59 (Fig. 6), which is journaled in bearings 60 in a saw bracket 61. The saw bracket 61 extends outwardly beyond the periphery of the saw 58 and is connected by pivot means 62 with fixed hanger brackets 63. The hanger brackets 63 are secured to the brackets 44 which are fastened to the overhead support 39. This leaves the outer end portions of the saw brackets 61, with which the saws 58 are connected, free to move up and down. An eye bolt 64 is connected by pivot means 65 with the saw bracket 61. This eye bolt 64 extends upwardly through a flange 66 of the bracket 44 and is provided above said flange 66 with a cushion member 67, as of rubber. Washer means 68 and nut means 69 are provided on eye bolt 64 above said cushion member 47. The eye bolt 64 limits the downward movement of the saw unit and the cushion member 67 affords enough resiliency to prevent pounding and shock as the saw unit descends.

A lift wheel 70 is secured to a shaft 71, which shaft is journaled in bearings 72 in upwardly extending lugs 73 on the end portion of the saw bracket 61. The lift wheel 70 is of substantially larger diameter than the saw 58 and the shaft 71 is positioned above, and substantially parallel to, the saw arbor 59. The lift wheels 70 are each preferably provided with a rubber tire to minimize shock and avoid marring the lumber. The lower peripheral portion of each lift wheel 70 extends a short distance below the lower peripheral portion of the saw 58 with which said lift wheel is connected, so that when a lift wheel is resting upon a piece of lumber the saw supported thereby will be entirely clear of said piece of lumber, see Fig. 5.

It has been found in practice that the combined weight of a lift wheel 70, saw 58 and bracket 61 are in excess of the weight necessary to properly hold the saw down to the work. To counterbalance as much of this excess weight as may be desired, I provide a lever arm 75 secured to the saw bracket 61 adjacent the pivot 62 and having a weight 76 adjustably supported thereon. The counterbalancing means provides for easier lifting of the wheels 70 and saws 58 when the moving pieces of lumber encounter the wheels and for easier lowering of said wheels and saws as the wheels drop off of the moving pieces of lumber. This reduces shock and impact due, first, to the moving pieces of lumber striking against the lifting wheels and, second, to the lifting wheels striking the deck 74 as they drop off of the moving pieces of lumber. When the counterweight 76 is properly adjusted, the lifting wheels 70 and saws 58 will have more of a floating action and not so much jar and bump as the pieces of lumber pass thereunder.

The saws 58 are driven, in the direction indicated by the arrows in Figs. 2 and 4, by multiple belts 77 of tapered cross section operable on grooved belt pulleys 78 and 79 on the saw arbor 59 and saw driving shaft 41, respectively. The several saws 58 and the continuously operating saw 36 are all driven in such a direction as to cause the lower peripheral portions of these saws to travel in the same direction as the pieces of lumber they are trimming. This results in a smoother trimming of the pieces of lumber than would be possible if the cutting portions of the saws moved in the opposite direction from the work, as is common practice in sawing lumber.

The pivot 62 of the saw bracket 61 is positioned a short distance forwardly from the saw driving shaft 41 and slightly below the plane of said saw driving shaft. When the lift wheel 70 and saw 58 are raised in passing over a piece of lumber, as shown in Fig. 4, the belt 77 which drives the saw will be slackened slightly, but the saw will not be cutting and there will be no objectionable slipping of the belt 77 and this slackness will always be taken up when the saw is lowered into cutting position.

The saws are all driven continuously from the shaft 41. As pieces of lumber are moved, by the conveyor belts 19, under and past the saws the continuously operating end saw 36 will always trim the end portion of each piece of lumber which has been positioned against the stop 33 and all of the saws 58 controlled by lift wheels, which are in the path of the piece of lumber passing the saws, will be lifted clear of said piece of lumber and the first saw 58, whose lift wheel 70 is beyond the end of said piece of lumber, will trim the other end of said piece of lumber. In Fig. 5 the lift wheel 70 and saw 58 at the right are shown as elevated with the lift wheel on a piece of lumber and the saw clear of said piece of lumber, while the lift wheel and saw at the left are shown in their lowermost position, with the lift wheel beyond the end of the piece of lumber and not elevated, and the saw 58 trimming off the end of the piece of lumber. Where a plurality of the lift wheel and saw units are provided in side by side relation, as shown in Figure 1, it will be obvious that each piece of lumber will be trimmed to a maximum length and the least possible amount of lumber wasted in reducing the pieces to predetermined lengths.

If the end of a piece of lumber chances to follow a path between a saw 58 and the adjacent lift wheel 70 of the next unit, then obviously the end of this piece of lumber will escape being trimmed. The distance between any saw 58 and the adjacent lift wheel 70 of the next unit has been reduced to a minimum, as indicated in Figs. 1 and 5, to minimize the possibility of this occurring. Furthermore, the pieces of lumber fed to this random length trimmer will ordinarily be pieces which have been roughly sized to a length slightly more than a predetermined standard dimension, so that the end portion being trimmed by a saw connected with a lift wheel will only extend a short distance beyond the saw and the only pieces which would escape being trimmed would be pieces which were short of a standard dimension, a distance less than the distance between a saw and the inner side of the lift wheel of an adjacent unit.

It has been found that a circular saw, used in the manner herein disclosed, will operate satisfactorily for trimming pieces of lumber of a thickness substantially up to the maximum thickness which will pass under and clear the hub of the saw while being cut off. If a lift wheel of substantially the same diameter as the saw which it controls is used, then a piece of lumber of maximum thickness or even one which is considerably less than maximum thickness will strike the lift wheel too nearly in line with the axis of said lift wheel and will produce undesirable shock and strain on the machine and lift the saw too abruptly and may even result in the marring of the lumber. By making the lift wheel of substantially larger diameter than the saw, it is possible to provide a construction in which the maximum cut of the saw may be utilized and at the same time smoothness of operation obtained and undesirable shocks and bumps avoided. If the saws shown in Figs. 1 to 9, inclusive, were made substantially as large as the lift wheels, they would be heavier and more expensive and would require heavier and stronger arbors and mountings and would also require more power to drive them. By making the saws of minimum size for the work required and making the lift wheels of substantially larger diameter than the saws, I am able to secure smoothness of operation in a machine of minimum weight and minimum cost.

In Figs. 7, 8, and 9 I have shown a preferred form of my invention in which a lift wheel is made readily detachable from the saw which it controls. In these Figs. 7, 8, and 9, the overhead support 39, bracket 44—43, saw driving shaft 41, lift wheel 70 and saw 58 are the same as those hereinbefore described. A saw supporting bracket 80 of modified construction is pivoted at 81 to a hanger 82 and is supported in its lowermost position by an eye bolt 83. The saw 58 is secured to an arbor 84 which is journaled in the bracket 80 and driven in the same manner as the saw arbor 59 hereinbefore described.

The lift wheel 70 is secured to a shaft 85 which is journaled in a separate lift wheel bracket 86. The lift wheel bracket 86 is connected by a pivot 87 with the bracket 80. The pivot 87 is positioned a short distance forwardly from the pivot 81. A bell-crank shaped hook member 88, having a weight 89 provided thereon, is fulcrumed on a pivot member 90 which extends crosswise of the forward end of the lift wheel bracket 86. The hook member 88 is adapted to engage with a pin 91, which extends crosswise through extensions 92 formed at the forward end of the saw supporting bracket 80. The weight 89, when it is left free and unrestrained, tends to hold the hook member 88 in engagement with the pin 91. The forward edge of the hook member 88 is provided with a bevel or incline 93. This incline 93 is adapted to engage the pin 91 and deflect the hook 88 outwardly as the wheel supporting bracket is lowered, until the edge of the hook passes below the pin 91, whereupon the weight 89 will move the hook into engagement with the pin 91. Engagement of a stop member 94 on the hook with a pin 95 in the bracket 86 limits the angular movement of the hook toward the pin 91. The hook 88 may be disengaged from the pin 91, and the lift wheel 70 thereby disconnected from the saw 58, by exerting a pull on a cable 96, which is connected with the hook 88 outwardly from the weight 89 and extends over sheaves 97 to a suitable location from which it may be controlled. When the hook 88 is thus disengaged, said hook, together with the bracket 86 and lift wheel 70, may be held in an elevated position out of the way of the pieces of lumber which are passing thereunder, as indicated by dot and dash lines in Fig. 8, or the hook only may be held in an inoperative and unhooked position by the cable 96, leaving the lift wheel disconnected from the saw and free to be lifted by each piece of lumber which passes thereunder without lifting the saw. As long as the hook 88 is held in an unhooked and completely disengaged position as respects the pin 91 in the saw bracket 80, the saw 58 will remain in its lowermost position and will cut off every piece of lumber which passes thereunder. When the hook 88 is in engagement with the pin 91 in the saw bracket 80, the lift wheel and saw will be connected together and will operate in the same manner as the lift wheels and saws shown and described in Figs. 1 to 6, inclusive.

In the construction of an automatic random length trimmer of this nature, the several sawing units, each including a lift wheel and a saw, may all be made with the lift wheels and saws relatively non-detachable as shown in Figs. 1 to 6 or said units may all be made with the lift wheels and saws relatively detachable as shown in Figs. 7, 8, and 9, or some of the units may have non-detachable lift wheels and the other units may have detachable lift wheels to provide for a positive cut-off of all of the pieces of lumber passing through the machine at certain lengths. For instance, if the lift wheel of the saw, which is positioned eight feet distant from the continuously operating end trimmer saw, can be disconnected, then by disconnecting said lift wheel, the eight foot saw can be made to function as a cut-off saw which will cut off eight feet from all pieces of lumber of an initial length of more than eight feet which pass through the machine.

The lift wheel and saw unit, shown in Figs.

7, 8, and 9, is of a narrower width than the corresponding units shown in Figs. 1 to 6, as the unit shown in Figs. 7, 8, and 9 are designed to be within the limits required for a one foot spacing in a machine, while the units shown in Figs. 1 to 6 are designed for use where the spacing of the saws is more than one foot, as for instance two feet apart.

Figures 11, 12:
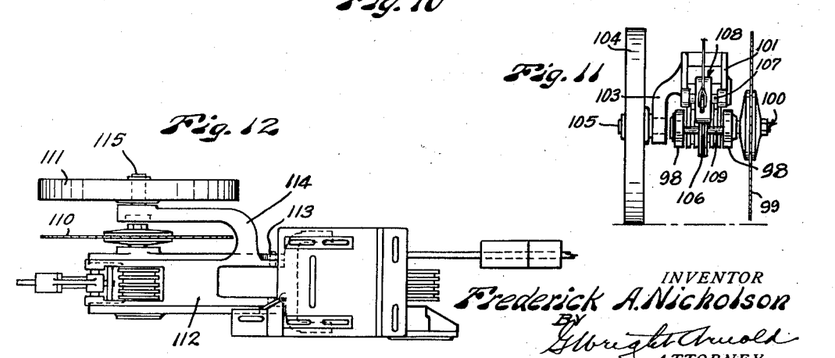
Fig. 11 is a front elevation of the device shown in Fig. 10, parts being omitted.
Fig. 12 is a plan view, with parts omitted, of a modified form of the device shown in Figs. 10 and 11.

Figs. 10 and 11 disclose a type of lift wheel and saw unit in which the lift wheel is only slightly larger in diameter than the saw. This unit embodies a saw supporting bracket 98, similar to the bracket 80 shown in Figs. 7, 8, and 9 and mounted for swinging movement in a similar manner. A saw 99 is mounted on an arbor 100 which is journaled in the bracket 98. A lift wheel supporting bracket 101 is fulcrumed at 102 on the saw supporting bracket 98. A secondary integral bracket 103 extends sidewise and downwardly from the saw supporting bracket 101 and a lift wheel 104 is rotatably mounted on an axle member 105 which is rigid with and projects sidewise from the secondary bracket 103. A hook 106 is mounted on a pivot 107 in the bracket 101 and has a weight portion 108 and is adapted to be releasably engaged with a transverse pin 109 in the bracket 98. This hook and the parts which cooperate therewith are preferably the same as the corresponding elements shown in Fig. 8 and operate to selectively connect or disconnect the lift wheel 104 and the saw 99. In the construction disclosed in Figs. 10 and 11, the lift wheel 104 and saw 99 are substantially the same size and can be operatively connected or disconnected relative to each other. Said lift wheel 104 and saw 99 are also mounted on different bearing means, namely, the axle 105 and arbor 100, which bearing means are capable of being axially aligned or axially disaligned depending on whether the lift wheel and saw are operatively connected or are disconnected. In this construction lift wheel 104 is on one side of the bracket members 98 and 101, and the saw 99 is on the other side. This makes it possible to position the saw 99 in close proximity to the lift wheel of an adjacent unit, a desirable feature when several of these units are assembled to form a machine, as it reduces the possibility of pieces of lumber passing through the machine without having the end which passes under the lift wheel and saw units trimmed, as pointed out in connection with Fig. 1. The mounting and driving means used in connection with the device shown in Figs. 10 and 11 may be the same as those shown and described in connection with the preceeding figures.

In Fig. 12 I have shown a construction in which a saw 110 and lift wheel 111 of substantially equal diameters are both positioned in very close proximity to each other on the same side of the bracket means by which they are supported. In the device shown in Fig. 12, all of the parts except the lift wheel supporting bracket are substantially the same as in preceding figures and the description of these parts will not be repeated. The lift wheel supporting bracket 112 is pivoted to the saw bracket at 113 and has an integral secondary bracket 114 extending outwardly from one side thereof just forward of the pivot and thence forwardly on the outer side of the saw 110. An axle 115 is provided on the forward end of the bracket 114 and the lift wheel 111 is mounted on said axle. In this construction, the bracket 114 extends around the saw 110 to the outer side thereof and the saw 110 and lift wheel 111 are positioned close together, while in the devices shown in Figs. 1 to 11, inclusive, the saw and lift wheel are positioned on opposite sides of the bracket means by which they are supported.

Figures 13, 14:
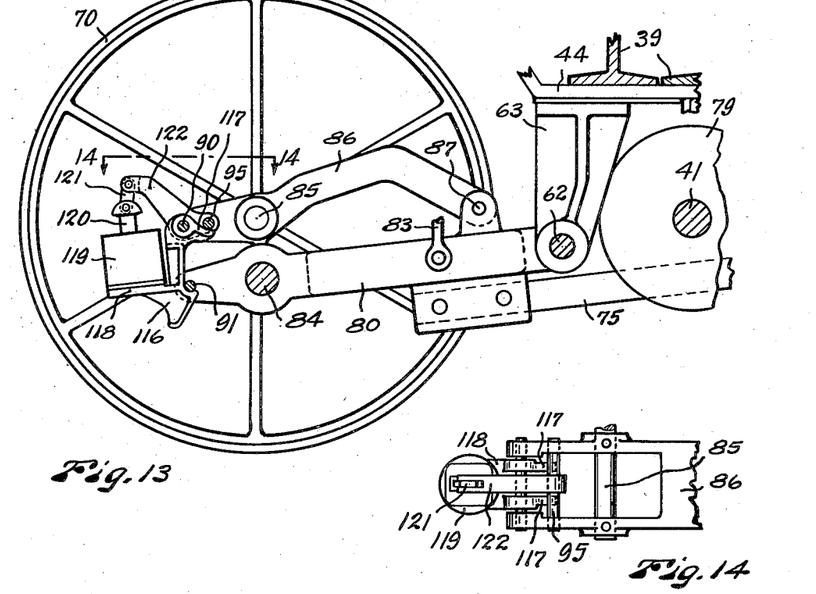
Fig. 13 is a view partly in elevation and partly in section, with parts broken away, showing a modified form of mechanism for detachably connecting a lift wheel and a saw.
Fig. 14 is a fragmentary plan view substantially on broken line 14—14 of Fig. 13.
Figure 15:
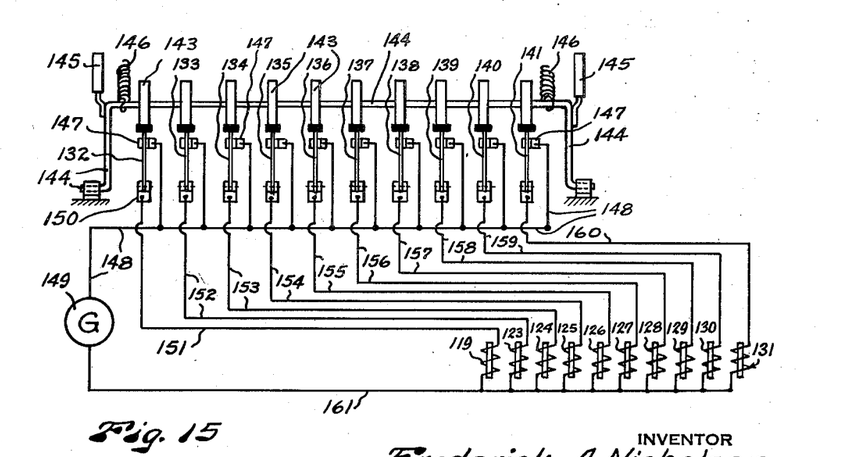
Fig. 15 is somewhat diagrammatic, illustrating the electrical connections of the solenoids for controlling the mechanism shown in Fig. 13.

Figs. 13, 14, and 15 disclose a modified form of the invention in which electrically controlled means provide a ready detachable saw and lift wheel unit. In these figures all of the parts are similar to those disclosed in Figs. 7 to 9, inclusive, except the solenoid mechanism and control means therefor, which are used to provide operating means for engaging or disengaging the lift wheel bracket 86 and the saw supporting bracket 80. In these figures, as well as in Figs. 7 to 9, inclusive connection between the lift wheel bracket and the saw supporting bracket is accomplished through hook means pivotally supported on pivot 90 and detachably engageable with pin 91. Hook 116 is pivotally supported on the pivot 90 and the angular movement of the hook 116 in one direction is likewise limited by engagement of projecting means 117 with a pin 95. The hook 116 is provided with a shelf portion 118, upon which is mounted a solenoid 119. The solenoid 119 has a core member 120 which is connected by a link 121 with a supporting bracket 122. The supporting bracket 122 is fixed as respects the lift wheel bracket 86. This may be accomplished by mounting said supporting bracket 122 on the pivot 90 and the pin 95. In Fig. 14 this supporting bracket 122 is shown as mounted between the projecting means 117 of the hook 116. When the solenoid 119 is not energized, the weight of said solenoid, together with the weight of the shelf portion 118 will tend to hold the hook member 116 in engagement with the pin 91, thus connecting the lift wheel bracket 86 to the saw supporting bracket 80. When the solenoid 119 is energized, said solenoid and the core member 120 will tend to move relatively toward each other. Due to the fact that the core member 120 is fixed, this will result in upward movement of the solenoid 119 and disengagement of the hook 116 as respects pin 91. Disengagement of the hook 116 disengages the saw supporting bracket 80 from the lift wheel bracket 86.

Referring to Fig. 15, the solenoid 119 is indicated diagrammatically. Similar to the previously described devices shown in Fig. 7 to 12, inclusive, a plurality of detachable lift wheel units may be employed and in the control means shown in Fig. 15 I have indicated a plurality of solenoids 119 and 123 to 131, inclusive, for controlling the operation of a plurality of sets of lift wheels and saws. I have indicated somewhat diagrammatically electrical switches 132 and 141, inclusive. Each of said switches is provided with an insulated handle 143. These handles are operatively positioned to be opened by the pivotal movement of a yoke shaped member 144. This yoke shaped member 144 is provided with handles 145, so that every switch which is closed may be opened by pivotal movement of the yoke shaped member 144. Springs 146 return the yoke shaped member 144 to an inoperative position, so that any one or all of the switches may be closed. The switches 132 to 141, inclusive, each have one terminal 147 connected by common circuit wire means 148, with a source of supply of electric current 149, as a generator. The switches 132 to 141, inclusive, each have the other terminals 150 connected by independent circuit wires 151 to 160, inclusive, respectively, with the solenoids 119 and 123 to 131, inclusive. The solenoids 119 and 123 to 131, inclusive, are connected by a conductor 161 to a source of energy 149.

When the switches 132 to 141 are open, the solenoids connected therewith are deenergized. This permits the hooks 116, which are connected with said solenoids, to close by gravity and lock the saw supporting brackets 80 and the lift wheel brackets 86 together. By closing any one of said switches 132 to 141, inclusive, it is possible to energize any selected solenoid 119 or 123 to 131, inclusive, thus disengaging the lift wheel from any desired saw in a machine which embodies a plurality of the saw and lift wheel units. If a plurality of the switches 132 to 141, inclusive, are closed and it is desired to open all of said switches at one time, this may be done by clasping the handle 145 of the yoke member 144 and moving the yoke member angularly to engage the switch handles 143 and open said switches. As soon as the yoke member is released it will be retracted into an inoperative position and the switches may then be operated independently of the yoke member.

When electrically controlled means are used to connect or disconnect the lift wheel bracket 86 with a saw supporting bracket 80, greater speed of operation is possible than when the mechanical means, shown in Figs. 7 to 9, inclusive, are used. In the event that it is desired to saw out a section of a board intermediate its length, it is possible for the operator to close two switches, such as switches 136 and 137 and remove a section intermediate the length of the board. Such a need would readily arise in the event of imperfections in the lumber.

In connection with the electrical diagram shown in Fig. 15, I have indicated knife switches, but it will be understood that these knife switches may be replaced by any other desired type switches within the scope of my invention.

The operation of this random length lumber trimmer may be briefly summarized as follows: The motors 23 and 50 drive the conveyor belts 19 and saws 36 and 58 continuously. The pieces of lumber to be trimmed are delivered onto the end portions of the conveyor belts 19 adjacent the shaft 16 in positions substantially crosswise of the conveyor belts. These pieces of lumber are engaged by the lugs 22 and moved first across the positioning rolls 32 and thence to the saws. As the pieces of lumber pass across the positioning rolls, said pieces of lumber are moved endwise against the stop 33 and are properly positioned so that the end of each piece which contacts the stop 33 will have a thin cut taken by the continuously operating saw 36. If the positioning rolls 32 and stop 33 are dispensed with, then the pieces of lumber may be correctly positioned on the conveyor belts manually. As the pieces of lumber rest either on the positioning rolls 32 or the fixed lumber supporting members 29 they will be retarded by friction and aligned with one edge against the aligned lugs 22 of the conveyor belts. This will position each piece of lumber substantially at right angles to the plane of the saws which it is approaching and insure substantially square ends after trimming. As each piece of lumber reaches the line of the saws all of the lift wheels in the path of said piece of lumber will be raised by the piece of lumber passing thereunder and the saws, connected with the lift wheels thus raised, will be elevated above and clear of the piece of lumber, but the saw which is connected with the first lift wheel beyond the end of said piece of lumber will not be raised and will trim the end portion off of said piece of lumber. In this connection it should be borne in mind that the pieces of lumber which are fed to this machine usually have previously been roughly sized as to length, so that they are slightly in excess of the predetermined longitudinal dimensions which the saws are set to cut. This means that the end of each piece of lumber which is passing under the lift wheel controlled saws will extend a short distance beyond the line of one of said saws and will be trimmed by the last saw beyond which it extends.

If one or more of the units shown in Figs. 7, 8, and 9, or in Figs. 13 and 14 are used, in which the lift wheel is adapted to be disengaged from the saw, then any one of these units may be made to function as a cut-off saw at the location at which it is positioned, by disengaging the lift wheel from the saw or a desired section may be cut out by the use of two saws intermediate the length of a board.

Obviously, changes may be made in the forms, dimensions and arrangement of the parts of my invention, without departing from the principle thereof, the above setting forth only preferred forms of embodiment.

I claim:

1. In a trimming device, a driven circular saw, vertically movable saw mounting means supporting said saw for rotation, a lift wheel, vertically movable lift wheel mounting means, detachable means connecting said saw mounting means and said lift wheel mounting means and solenoid controlled means for said detachable means carried by the detachable means.

2. In a trimming device, a driven circular saw, vertically movable saw mounting means supporting said saw for rotation, a lift wheel, vertically movable lift wheel mounting means, and detachable means connecting said saw mounting means and said lift wheel mounting means, said detachable means comprising a pivotally mounted gravity closing hooked member carrying solenoid controlled hook detaching means, whereby the weight of the solenoid serves to aid in the gravity closing of said hooked member.

3. In a trimming device, a vertically movable mounting means; a horizontal saw mounting axis carried by said vertically movable mounting means and mounted for rotary movement; means for rotating said saw mounting axis; a circular saw mounted on said saw axis and positioned on one side of said vertically movable mounting means; other mounting means positioned above, in superposed relation to, and vertically movable with said vertically movable mounting means; a horizontal lift wheel mounting axis carried by said other mounting means, said lift wheel mounting axis being positioned in a common vertical plane with, parallel to and above the said saw axis; and a lift wheel of substantially larger diameter than said circular saw rotatively mounted on said lift wheel axis and positioned on the other side, as respects the position of said circular saw, of said vertically movable mounting means, whereby the width of the trimming device from the saw to the lift wheel may be reduced to a minimum.

4. In a trimming device, a vertically movable mounting means; a horizontal saw mounting axis carried by said vertically movable mounting means and mounted for rotary movement; means for rotating said saw mounting axis; a circular saw mounted on said saw axis and positioned on one side of said vertically movable mounting means;

other vertically movable mounting means positioned above and in superposed relation to said first mentioned vertically movable mounting means; means detachably connecting said first mentioned vertically movable mounting means with said other vertically movable mounting means; a horizontal lift wheel mounting axis carried by said other vertically movable mounting means, said lift wheel mounting axis being positioned in a common vertical plane with, parallel to and above the said saw axis; and a lift wheel of substantially larger diameter than said circular saw rotatively mounted on said lift wheel axis and positioned on the other side, as respects the position of said circular saw, of said first mentioned vertically movable mounting means, whereby the width of the trimming device from the saw to the lift wheel may be reduced to a minimum.

FREDERICK A. NICHOLSON.